(12) United States Patent
Veeravarasapu et al.

(10) Patent No.: US 11,847,824 B2
(45) Date of Patent: Dec. 19, 2023

(54) COMPUTER VISION SYSTEMS AND METHODS FOR DETECTING AND ALIGNING LAND PROPERTY BOUNDARIES ON AERIAL IMAGERY

(71) Applicant: Insurance Services Office, Inc., Jersey City, NJ (US)

(72) Inventors: Venkata Subbarao Veeravarasapu, Munich (DE); Deepak Mittal, Haryana (IN)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 17/528,859

(22) Filed: Nov. 17, 2021

(65) Prior Publication Data
US 2022/0156493 A1 May 19, 2022

Related U.S. Application Data

(60) Provisional application No. 63/114,800, filed on Nov. 17, 2020.

(51) Int. Cl.
*G06V 10/52* (2022.01)
*G06V 20/10* (2022.01)
*G06V 10/46* (2022.01)

(52) U.S. Cl.
CPC ........... *G06V 20/176* (2022.01); *G06V 10/46* (2022.01); *G06V 10/52* (2022.01); *G06V 10/478* (2022.01)

(58) Field of Classification Search
CPC ...... G06V 10/46; G06V 10/52; G06V 10/478; G06V 20/17; G06V 20/176; G06V 20/13; G06V 30/18019
See application file for complete search history.

(56) References Cited

U.S. PATENT DOCUMENTS

| | | | |
|---|---|---|---|
| 11,308,714 B1 * | 4/2022 | Christoudias | G06V 20/176 |
| 2018/0373932 A1 * | 12/2018 | Albrecht | G06V 20/188 |
| 2021/0374965 A1 * | 12/2021 | Richter | G06T 7/187 |

FOREIGN PATENT DOCUMENTS

CN 108898603 A * 11/2018 ............... G06T 7/11

OTHER PUBLICATIONS

Translation of CN108898603 (Year: 2018).*

(Continued)

*Primary Examiner* — Carol Wang
(74) *Attorney, Agent, or Firm* — McCarter & English, LLP

(57) ABSTRACT

Systems and methods for detecting and aligning land property boundaries on aerial imagery are provided. The system receives an aerial imagery having land properties. The system applies a feature encoder having a plurality of levels to the aerial imagery. A first level of the plurality of levels includes a convolution block and a discrete wavelet transform layer. The discrete wavelet transform layer decomposes an input feature tensor to the first level into a low-frequency band and a high-frequency band. The high-frequency band is cached and processed with side-convolutional blocks before the high-frequency band are passed to a feature decoder. The system applies the feature decoder to an output of the feature encoder based at least in part on one of inverse discrete wavelet transform layers. The system determines boundaries of the one or more land properties based at least in part on a boundary cross-entropy loss function.

27 Claims, 15 Drawing Sheets
(6 of 15 Drawing Sheet(s) Filed in Color)

(56) References Cited

OTHER PUBLICATIONS

"Property/Casualty Insurers See Increase in Net Underwriting Gains and Record Surplus in the First Nine Months of 2019," Verisk Analytics (2020) retrieved from: https://www.verisk.com/pressreleases/2020/january/propertycasualty-insurers-seeincrease-in-net-underwriting-gains-and-record-surplusin-the-first-nine-months-of-2019/ (3 pages).
Bertasius, et al., "High-for-Low and Low-for-High: Efficient Boundary Detection from Deep Object Features and its Applications to High-Level Vision," In Proceedings of the IEEE International Conference on Computer Vision (2015) (9 pages).
Chen, et al., "Encoder-Decoder with Atrous Separable Convolution for Semantic Image Segmentation," In Proceedings of the European Conference on Computer Vision (ECCV) (2018) (18 pages).
Golovanov, et al., "Building Detection from Satellite Imagery Using a Composite Loss Function," In CVPR Workshops (2018) (4 pages).
Gong, et al., "Earthquake-Induced Building Damage Detection with Post-Event Sub-Meter VHR TerraSAR-X Staring Spotlight Imagery," Remote Sensing (2016) (21 pages).
Guo, et al., "Deep Wavelet Prediction for Image Super-Resolution," In Proceedings of the IEEE Conference on Computer Vision and Pattern Recognition Workshops (2017) (10 pages).
Gupta, et al., "Creating xBD: A Dataset for Assessing Building Damage from Satellite Imagery," In Proceedings of the IEEE Conference on Computer Vision and Pattern Recognition Workshops (2019) (8 pages).
Gupta, et al., "RescueNet: Joint Building Segmentation and Damage Assessment from Satellite Imagery," arXiv:2004.07312, Apr. 15, 2020 (7 pages).
Gyawali, et al., "Wavelets to the Rescue: Improving Sample Quality of Latent Variable Deep Generative Models," arXiv: 1911.05627v1, Oct. 26, 2019 (9 pages).
He, et al., "Deep Residual Learning for Image Recognition," arXiv:1512.03385v1, Dec. 10, 2015 (12 pages).
Heinrich, et al., "Roof Age Determination for the Automated Site-Selection of Rooftop Solar," arXiv:2001.04227v1, Jan. 8, 2020 (6 pages).
Huang, et al., Wavelet-SRNet: A Wavelet-Based CNN for Multi-Scale Face Super Resolution. In Proceedings of the IEEE International Conference on Computer Vision (2017) (9 pages).
Klein, et al., "Elastix: A Toolbox for Intensity-Based Medical Image Registration," IEEE Transactions on Medical Imaging, vol. 29, No. 1, Jan. 2010 (10 pages).
Li, et al., "Building Damage Detection from Post-Event Aerial Imagery Using Single Shot Multibox Detector," Applied Sciences (2019) (13 pages).
Li, et al., "Wavelet U-Net for Medical Image Segmentation," In International Conference on Artificial Neural Networks, Springer, 2020 (11 pages).
Yang, et al., "Geo-Parcel Based Crop Identification by Integrating High Spatial-Temporal Resolution Imagery from Multi-Source Satellite Data," Remote Sensing (2017) (20 pages).
Yu, et al., "Supplemental Material for Wavelet Flow: Fast Training of High Resolution Normalizing Flows," 34th Conference on Neural Information Processing Systems (NeurIPS 2020) (25 pages).
Yu, et al., "CASENet: Deep Category-Aware Semantic Edge Detection," In Proceedings of the IEEE Conference on Computer Vsion and Pattern Recognition (2017) (10 pages).
Liasis, et al., "Satellite Images Analysis for Shadow Detection and Building Height Estimation," ISPRS Journal of Photogrammetry and Remote Sensing (2016) (14 pages).
Ma, et al., "Detailed Dense Inference with Convolutional Neural Networks Via Discrete Wavelet Transform," arXiv:1808.01834, Aug. 6, 2018 (9 pages).
Maggiori, et al., "Can Semantic Labeling Methods Generalize to Any City? The Inria Aerial Image Labeling Benchmark," In 2017 IEEE International Geoscience and Remote Sensing Symposium (IGARSS) (2017) (4 pages).
Mohajeri, et al., "A City-Scale Roof Shape Classification Using Machine Learning for Solar Energy Applications," Renewable Energy (2018) (13 pages).
Nex, et al., "Structural Bbuilding Damage Detection with Deep Learning: Assessment of a State-of-the-Art CNN in Operational Conditions," Remote Sensing (2019) (17 pages).
Simonyan, et al., "Very Deep Convolutional Networks for Large-Scale Image Recognition," arXiv:1409.1556v5, Dec. 23, 2014 (13 pages).
Mallat, Stephane, "A Wavelet Tour of Signal Processing," Academic Press (1999) (661 pages).
Stepinac, et al., "A Review of Emerging Technologies for an Assessment of Safety and Seismic Vulnerability and Damage Detection of Existing Masonry Structures," Applied Sciences (2020) (16 pages).
Takikawa, et al., "Gated-SCNN: Gated Shape CNNs for Semantic Segmentation," In Proceedings of the IEEE International Conference on Computer Vision (2019) (10 pages).
Tu, et al., "Automatic Building Damage Detection Method Using High-Resolution Remote Sensing Images and 3D GIS Model," ISPRS Annals of Photogrammetry, Remote Sensing & Spatial Information Sciences (2016) (8 pages).
Veeravasarapu, et al., "Proalignnet: Unsupervised Llearning for Progressively Aligning Noisy Contours," In Proceedings of the IEEEICVF Conference on Computer Vision and Pattern Recognition (2020) (9 pages).
Yang, et al., "Object Contour Detection with a Fully Convolutional Encoder-Eecoder Network," In Proceedings of the IEEE Conference on Computer Vision and Pattern Recognition (2016) (10 pages).

\* cited by examiner

| Boundaries | Alignment | Average offset ($\%px \leq 3ft$) |
|---|---|---|
| | Test pairs | 42.38 (48%) |
| CASENet | ProAlignNet | 20.63 (75%) |
| Ours (WBNet) | Elastix | 18.72 (77%) |

160 ⟶

| Thresh | Method | class-I | clas-II | mean |
|---|---|---|---|---|
| 1px | Baseline | 49.4 | 33.3 | 41.4 |
| | DeepLabV3+ | 49.3 | 34.4 | 41.9 |
| | CASENet | 44.5 | 21.1 | 32.8 |
| | WCNN | 53.9 | 36.8 | 45.4 |
| | GSCNN | 50.2 | 37.1 | 43.7 |
| | WPNet (Ours) | 57.5 | 40.7 | 49.1 |
| | WBNet (Ours) | 61.9 | 48.0 | 55.0 |
| 3px | Baseline | 66.1 | 45.5 | 55.8 |
| | DeepLabV3+ | 66.2 | 46.2 | 56.2 |
| | CASENet | 63.0 | 32.7 | 47.9 |
| | WCNN | 67.9 | 48.2 | 58.1 |
| | GSCNN | 67.4 | 48.3 | 57.8 |
| | WPNet (Ours) | 72.0 | 52.5 | 62.2 |
| | WBNet (Ours) | 76.9 | 56.8 | 66.9 |
| 5px | Baseline | 74.4 | 52.1 | 63.2 |
| | DeepLabV3+ | 74.4 | 52.0 | 63.2 |
| | CASENet | 72.6 | 41.5 | 57.1 |
| | WCNN | 74.4 | 54.0 | 64.2 |
| | GSCNN | 74.9 | 53.2 | 64.1 |
| | WPNet (Ours) | 78.3 | 58.1 | 68.2 |
| | WBNet (Ours) | 83.9 | 61.3 | 72.6 |
| 9px | Baseline | 81.5 | 59.0 | 70.2 |
| | DeepLabV3+ | 80.9 | 59.5 | 70.2 |
| | CASENet | 80.2 | 51.3 | 65.8 |
| | WCNN | 79.4 | 61.2 | 70.3 |
| | GSCNN | 80.2 | 60.1 | 70.2 |
| | WPNet (Ours) | 82.8 | 65.4 | 74.1 |
| | WBNet (Ours) | 87.4 | 67.0 | 77.2 |

(a) sample from Austin tile 2

(b) predictions of (a)

(a) sample from Tyrol-west tile-17

(b) predictions of (a)

COMPUTER VISION SYSTEMS AND METHODS FOR DETECTING AND ALIGNING LAND PROPERTY BOUNDARIES ON AERIAL IMAGERY

RELATED APPLICATIONS

This application claims priority to U.S. Provisional Patent Application Ser. No. 63/114,800 filed on Nov. 17, 2020, the entire disclosure of which is hereby expressly incorporated by reference.

BACKGROUND

Technical Field

The present disclosure relates generally to the field of computer vision. More specifically, the present disclosure relates to computer vision systems and methods for detecting and aligning land property boundaries on aerial imagery.

Related Art

There is an ever-increasing use of aerial imagery from aircraft or satellites for building/property analysis. Especially in the property insurance industry, several companies are starting to use remotely sensed aerial imagery to inspect properties, analyze property boundaries, and to estimate land area, constructional assets, and other information. However, detecting property boundaries in images is a challenging task, as boundaries are often defined by relatively thin objects (such as fences, walls, etc.), and are sometimes difficult or impossible to perceive with the naked eye (especially when viewed from larger overhead distances). Moreover, it is often difficult to accurately align various types of data, such as land property boundary data, with images.

Thus, what would be desirable are computer vision systems and methods for detecting and aligning land property boundaries on aerial imagery, which address the foregoing, and other, needs.

SUMMARY

The present disclosure relates to computer vision systems and methods for detecting and aligning land property boundaries on aerial imagery. The system receives an aerial imagery having land properties. The system applies a feature encoder having a plurality of levels to the aerial imagery. A first level of the plurality of levels includes a convolution block and a discrete wavelet transform layer. The discrete wavelet transform layer decomposes an input feature tensor to the first level into a low-frequency band and a high-frequency band. The high-frequency band is cached and processed with side-convolutional blocks before the high-frequency band are passed to a feature decoder. The system applies the feature decoder to an output of the feature encoder based at least in part on one of inverse discrete wavelet transform layers. The system determines boundaries of the one or more land properties based at least in part on a boundary cross-entropy loss function.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of the invention will be apparent from the following Detailed Description of the Invention, taken in connection with the accompanying drawings, in which:

FIG. 10 is a table showing mF scores for different methods for performing property boundary detection on an aerial properties dataset;

DETAILED DESCRIPTION

Figure 1:
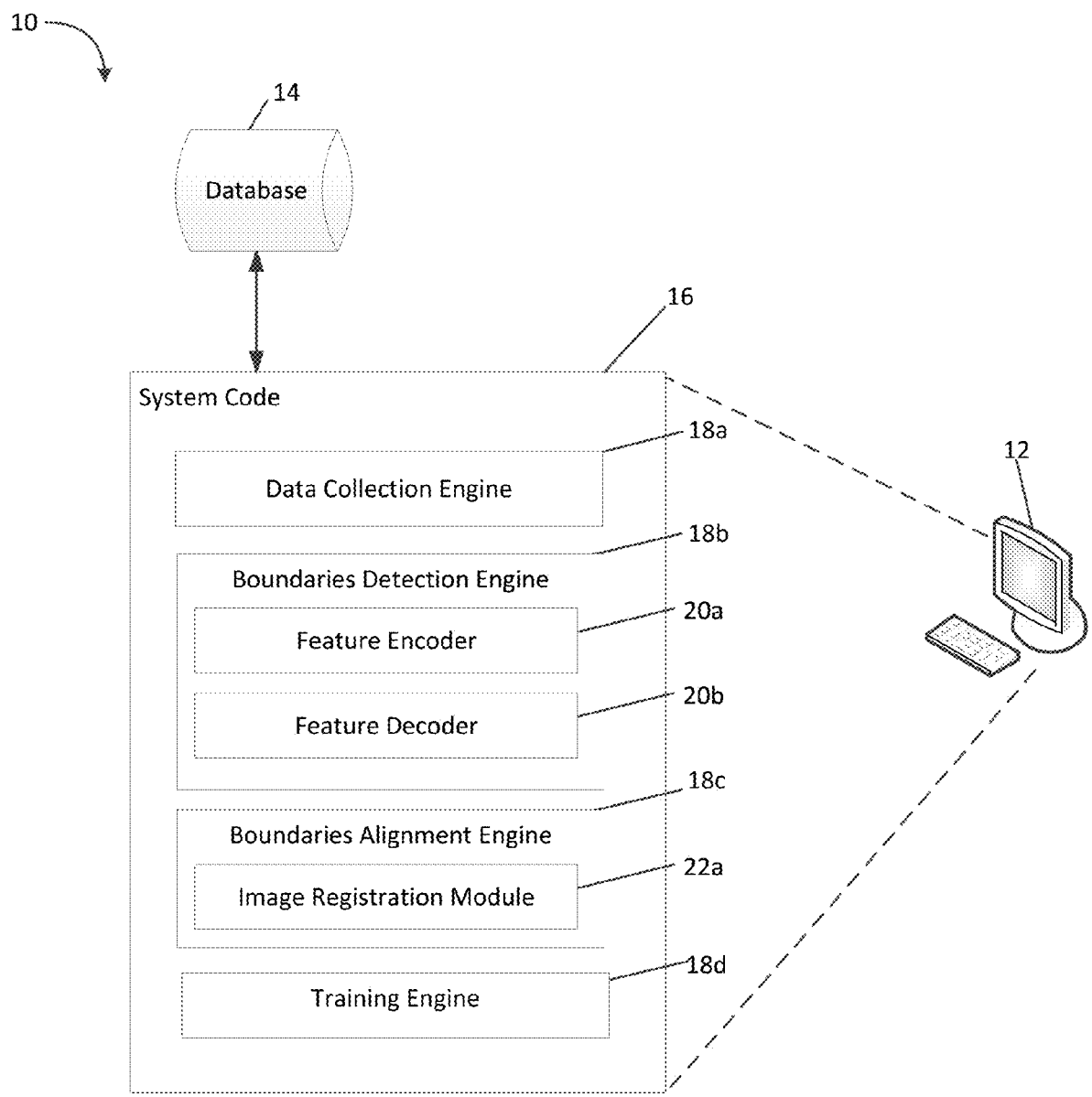
FIG. 1 is a diagram illustrating an embodiment of the system of the present disclosure.

The present disclosure relates to computer vision systems and methods for detecting and aligning land property boundaries on aerial imagery, as described in detail below in connection with FIGS. 1-15.

There are recent rising interests to develop automated solutions to address several tasks in the process of extracting land property information from the aerial images, including estimating property boundaries and align the historical surveyed land data (such as Geoparcels from local county/municipality records) to the aerial imagery. The computer vision systems and methods of the present disclosure can address localizing the objects (such as walls, fences, and hedges between the properties) that define private property boundaries, which provide better results compared with several state-of-the-art segmentation or contour detection architectures such as DeepLabV3+ or CASENet. Conventional methods perform poorly with thin-sized objects (e.g. boundary walls and fences), especially in the flight-captured aerial images.

Additionally, most of the recent segmentation or contour detection frameworks are based on ResNet architectures which use maxpool or convolution (Conv) layers with stride 2. However, the downsampling of these frameworks results in irreversible information loss mainly about small scale entities as property boundaries. The computer vision systems and methods disclosed herein rely on discrete wavelet transform (and its inverse) with pooling (and unpooling) to leverage wavelets to preserve the high-frequency details through downsampling and upsampling layers. Discrete wavelet transform (DWT) decouples low and high-frequency contents of the input features to separate bands with half the spatial dimension. The high frequency (HF) bands contain the detailed shape information, while low frequency (LF) bands contain the local average color/textural information from the input features. The LF bands can be treated as pooled tensors and passed to the subsequent convolution (Conv) block. The HF bands can be reused while upsampling with inverse wavelet transform (iDWT) in the lateral layers of the network. This process can deliver lossless pooling and unpooling schemes. Moreover, as HF bands capture local gradients, they can serve as cues to learn appearance-agnostic shape attributes of relevant boundary pixels. In some embodiments, the computer vision systems and methods can be used as plug-and-play on top of any classical convolutional neural network (CNN) backbone, such as VGG-19, ResNet-50, ResNet-101, or the like.

Further, automatic land property boundary analysis is a relatively new problem in computer vision fields; thus, there is a scarcity of datasets with the required ground-truth to train the deep models. The computer vision system and method disclosed herein use a large-scale and high-resolution aerial image dataset with property boundary labels. This dataset defines and annotates two categories of property boundaries: (a) road-connected boundaries, (ii) the boundaries that divide the property from neighbors (also referred to as Class-I and Class-II boundaries). The computer vision systems and methods can outperform the state-of-the-art segmentation model DeepLabV3+ and Contour detection models, CASENet, GSCNN [24] by large margins.

In some embodiments, the computer vision systems and methods can be used for aligning Geo-parcel survey data with aerial image maps. Geo-parcel data is generally used to identify the information about the property owner, construction entities, and legal boundaries in terms of global positioning system (GPS) coordinates. Due to several differences in their collection processes, these geo-parcel data often misalign with aerial image content to a large extent, sometimes on the order of 10 meters. This offset might lead to incorrect property asset assignments to individuals, resulting in incorrect tax assessments. Hence, aligning geo-parcel data onto aerial images is an important problem. The computer vision systems and methods disclosed herein provide better alignments than conventional deep-learning-based alignment network by combining the boundaries detection methods of the present disclosure with an image registration algorithm (e.g., Elastix, or the like.)

Specifically, the computer vision systems and methods disclosed herein provide an architecture that uses discrete wavelet transforms to preserve the detailed information about the small scale entities throughout deep network layers. A wavelet pyramidal loss is provided to help the network focus on the boundaries' finer level details. A large scale flight-captured aerial image dataset is used to train and evaluate the method to detect two categories of property boundaries, i.e., (i) road-connected boundaries, (ii) side/rear boundaries separate the property from neighbors (e.g., such as walls, fences, and hedges between the properties). The detected boundaries are used to automate Geoparcels (legal records of private property bounds) alignment process on aerial image maps in a combination with an image registration method (e.g., a classical off-the-shelf registration, or other suitable deep learning-based registration framework).

Turning to the drawings, FIG. 1 is a diagram illustrating an embodiment of the system 10 of the present disclosure.

The system 10 can be embodied as a central processing unit 12 (processor) in communication with a database 14. The processor 12 can include, but is not limited to, a computer system, a server, a personal computer, a cloud computing device, a smart phone, or any other suitable device programmed to carry out the processes disclosed herein. The system 10 can retrieve data from the database 14 associated with land property.

Land property can be a resource insured and/or owned by a person or a company. Examples of land property can include real estate property (e.g., residential properties such as a home, a house, a condo, an apartment, and commercial properties such as a company site, a commercial building, a retail store, etc.), or any other suitable land properties. A land property can include one or more exterior structural items indicative of boundaries (e.g., walls, fences, and hedges between the properties, or the like).

The database 14 can include various types of data including, but not limited to, media content (e.g., aerial imagery, videos, or the like) indicative of land property as described below, one or more outputs from various components of the system 10 (e.g., outputs from a data collection engine 18a, a boundaries detection engine 18b, a feature encoder 20a, a feature decoder 20b, a boundaries alignment engine 18c, an image registration module 22a, a training engine 18d, and/or other components of the system 10), one or more untrained and trained computer vision models for boundaries detection and alignment, and associated training data. The system 10 includes system code 16 (non-transitory, computer-readable instructions) stored on a computer-readable medium and executable by the hardware processor 12 or one or more computer systems. The system code 16 can include various custom-written software modules that carry out the steps/processes discussed herein, and can include, but is not limited to, the data collection engine 18a, the boundaries detection engine 18b, the feature encoder 20a, the feature decoder 20b, the boundaries alignment engine 18c, the image registration module 22a, and the training engine 18d. The system code 16 can be programmed using any suitable programming languages including, but not limited to, C, C++, C#, Java, Python, or any other suitable language. Additionally, the system code 16 can be distributed across multiple computer systems in communication with each other over a communications network, and/or stored and executed on a cloud computing platform and remotely accessed by a computer system in communication with the cloud platform. The system code 16 can communicate with the database 14, which can be stored on the same computer system as the code 16, or on one or more other computer systems in communication with the code 16.

The media content can include digital images and/or digital image datasets including ground images, aerial images, satellite images, etc. where the digital images and/or digital image datasets could include, but are not limited to, images of land property. Additionally and/or alternatively, the media content can include videos of land property, and/or frames of videos of land property. The media content can also include one or more three-dimensional (3D) representations of land property, such as point clouds, depth maps, light detection and ranging (LiDAR) files, etc., and the system 10 could retrieve such 3D representations from the database 14 and operate with these 3D representations. Additionally, the system 10 could generate 3D representations of land property, such as point clouds, depth maps, LiDAR files, etc. based on the digital images and/or digital image datasets. As such, by the terms "imagery" and "image" as used herein, it is meant not only 3D imagery and computer-generated imagery (e.g., LiDAR, point clouds, 3D images, etc.), but also two-dimensional (2D) imagery.

Still further, the system 10 can be embodied as a customized hardware component such as a field-programmable gate array ("FPGA"), an application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 2:
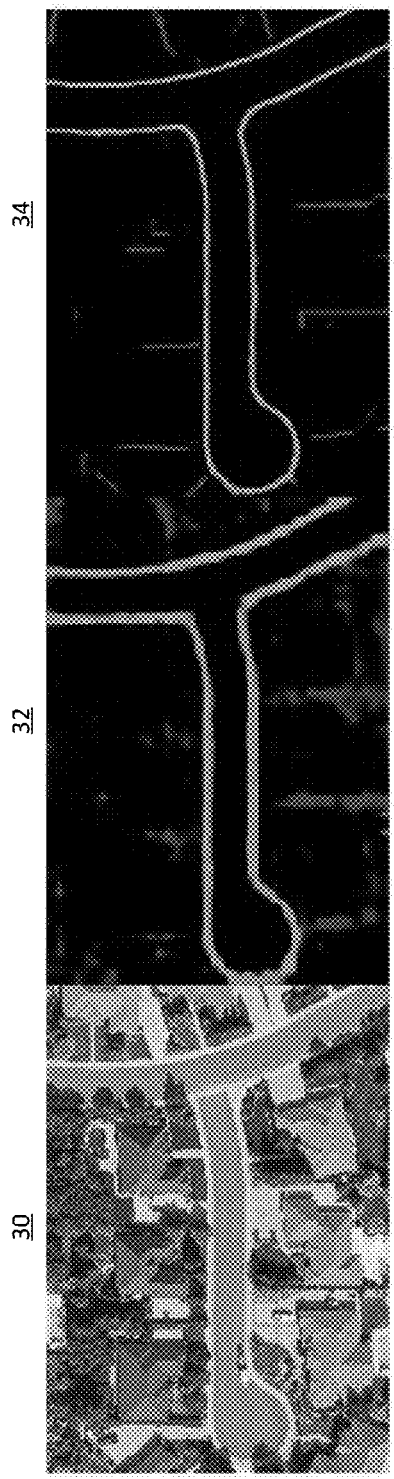
FIG. 2 illustrates examples of detecting and aligning land property boundaries on aerial imagery by the system of the present disclosure.
Figure 2:
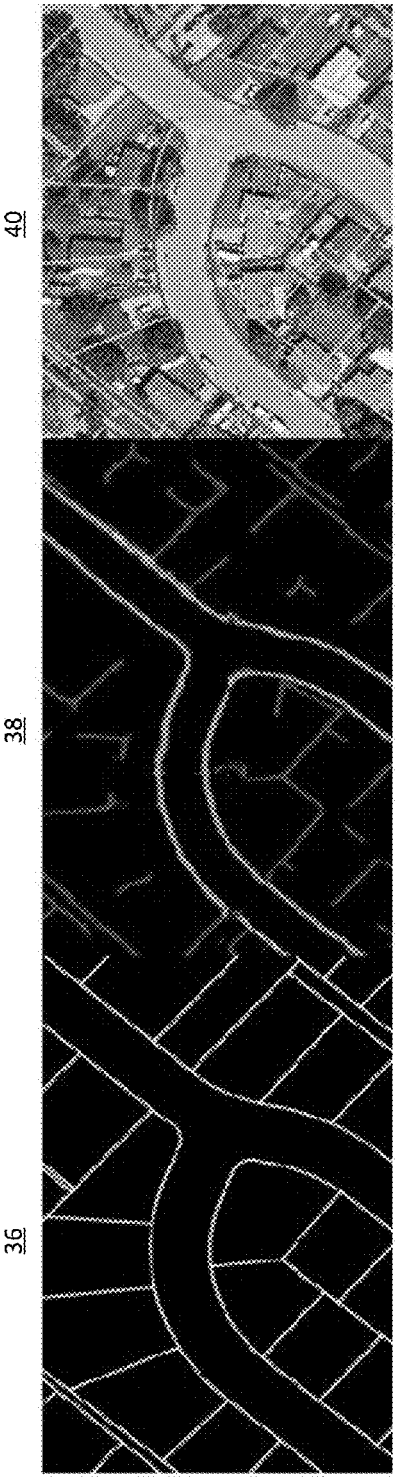

FIG. 2 illustrates examples of detecting and aligning land property boundaries on aerial imagery performed by the system 10 of the present disclosure. The system 10 can determine land property boundaries on an aerial image 30. The land property boundaries detected by the system 10 is shown in image 34. Compared with land property boundaries detected by the conventional techniques (e.g., CASNet, DeepLabV3+ or the like) shown in an image 32, the system provides cleaner and sharper land property boundaries, while the boundaries detected by the conventional techniques are blur and noisy. The system 10 can also use detected boundaries to correct offsets in Geo-parcel data. For example, the bottom row shows a geo-parcel image 36, an image 38 showing boundaries detected from a corresponding aerial image 40, and the aligned parcels overlaid (in magenta color) on the aerial image 40 along with original parcels (in cyan color).

Figure 3:
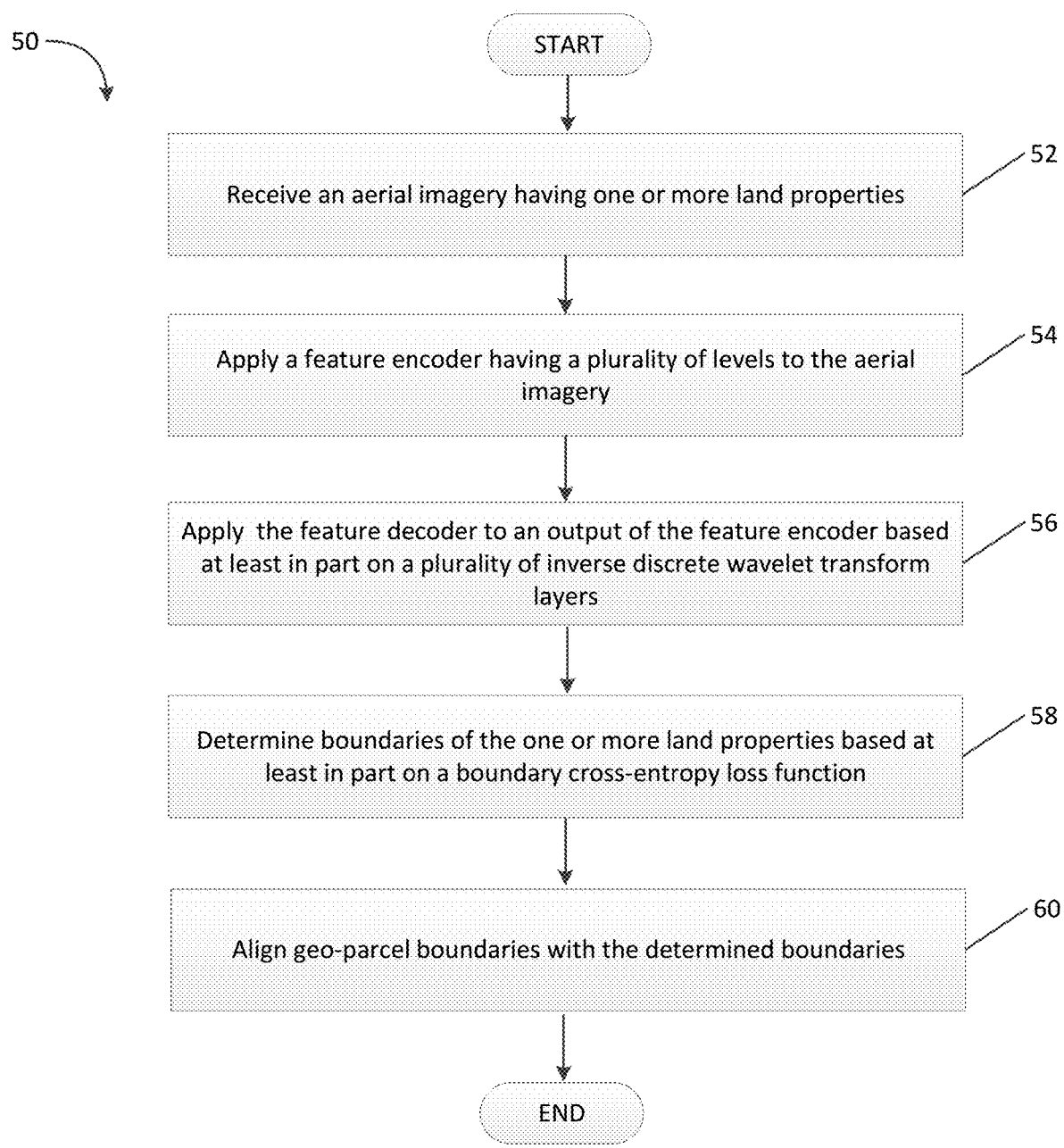
FIG. 3 is a flowchart illustrating overall processing steps carried out by the system of the present disclosure.

FIG. 3 is a flowchart illustrating overall processing steps 50 carried out by the system 10 of the present disclosure. Beginning in step 52, the system 10 receives an aerial imagery having one or more land properties. An aerial imagery can be a 2D or 3D representation of one or more land properties. The system 10 can obtain the aerial imagery from the database 14. Additionally and/or alternatively, the system 10 can instruct an image capture device (e.g., a digital camera, a video camera, a LiDAR device, an unmanned aerial vehicle (UAV), a flight, or the like) to capture the aerial imagery. In some embodiments, the system 10 can include the image capture device. Alternatively, the system 10 can communicate with a remote image capture device. It should be understood that the system 10 can perform the aforementioned task of receiving an aerial imagery via the data collection engine 18a. Still further, it is noted that the system 10, in step 52, can receive and process imagery and/or data provided to the system 10 by an external and/or third-party computer system.

In step 54, the system 10 applies a feature encoder having a plurality of levels to the aerial imagery. A first level of the plurality of levels includes a convolution block and a discrete wavelet transform layer. The discrete wavelet transform layer decomposes an input feature tensor to the first level into a low-frequency band and a high-frequency band. The high-frequency band is cached and processed with side-convolutional blocks before the high-frequency band are passed to a feature decoder.

In some embodiments, discrete wavelet transform (DWT) can decompose the given image or feature tensor into different frequency bands, thus permitting the isolation of the frequency components introduced by boundaries into certain subbands, mainly in high-frequency subbands. The forward transform is performed by applying 1D low-pass (ø) and high-pass (ψ) filters. This operations results in four decomposed subbands, referred to as low-low ($W^{ll}$), low-high ($W^{lh}$), high-low ($W^{hl}$) and high-high ($W^{hh}$) wavelet coefficients. Mathematically, it is defined as follows:

$$W^{ll}(i,j) = \sum_k \sum_l I(2i+k, 2j+l)\phi(k)\phi(l) \quad \text{Equation (1)}$$

$$W^{lh}(i,j) = \sum_k \sum_l I(2i+k, 2j+l)\phi(k)\psi(l)$$

$$W^{hl}(i,j) = \sum_k \sum_l I(2i+k, 2j+l)\psi(k)\phi(l)$$

$$W^{hh}(i,j) = \sum_k \sum_l I(2i+k, 2j+l)\psi(k)\psi(l)$$

where I denotes the input image or features of spatial dimensions H×W. As one can see in the above equation, all the convolutions are performed with stride 2, yielding a down-sampling with factor 2 along each spatial dimension. In other words, DWT results in four bands $\{W^{ll}, W^{lh}, W^{hl}, W^{hh}\}$ with spatial dimensions $$\frac{H}{2} \times \frac{W}{2}.$$

Inverse transform (iDWT) can reconstruct the input without loss of information from the given wavelet bands, as follows:

$$I_{(i,j)} = \sum_{k,l} (W^{ll}(\frac{i}{2}-k, \frac{j}{2}-l)\tilde{\phi}(k)\tilde{\phi}(l) + \quad \text{Equation (2)}$$

$$W^{lh}(\frac{i}{2}-k, \frac{j}{2}-l)\tilde{\phi}(k)\tilde{\psi}(l) +$$

$$W^{hl}(\frac{i}{2}-k, \frac{j}{2}-l)\tilde{\psi}(k)\tilde{\phi}(l) +$$

$$W^{hh}(\frac{i}{2}-k, \frac{j}{2}-l)\tilde{\psi}(k)\tilde{\psi}(l))$$

where $\{\tilde{\phi}, \tilde{\psi}\}$ and $\{\phi, \psi\}$ are bi-orthogonal wavelet filters that ensure exact reconstruction. In some embodiments, the system 10 can use Haar wavelets for the decomposition (Eq. 1), which are given by ø=(0.5, 0.5) and ψ=(0.5, −0.5). Then, the corresponding reconstruction filters (Eq. 2) are become $\tilde{\phi}=2\phi$, $\tilde{\psi}=2\psi$. In this scenario, it is worth noting that, while the low-frequency coefficients $\{\bullet\}^{ll}$ store local averages of the input data, its high-frequency counterparts, namely $\{\bullet\}^{lh}$, $\{\bullet\}^{hl}$ and $\{\bullet\}^{hh}$ encode local gradients which are vital in recovering sharp boundaries. This motivates usage of the high-frequency wavelet coefficients to improve the quality of pixel-level boundary extraction. A multiscale wavelet decomposition successively performs Eq. 1 on low-low frequency coefficients $\{\bullet\}^{ll}$ from fine to coarse resolution, while the reconstruction works reversely from coarse to fine resolution. As both Eqs. 1 and 2 are formulated via convolutions, these are implemented as convolutional layers with fixed weights.

Figure 5:
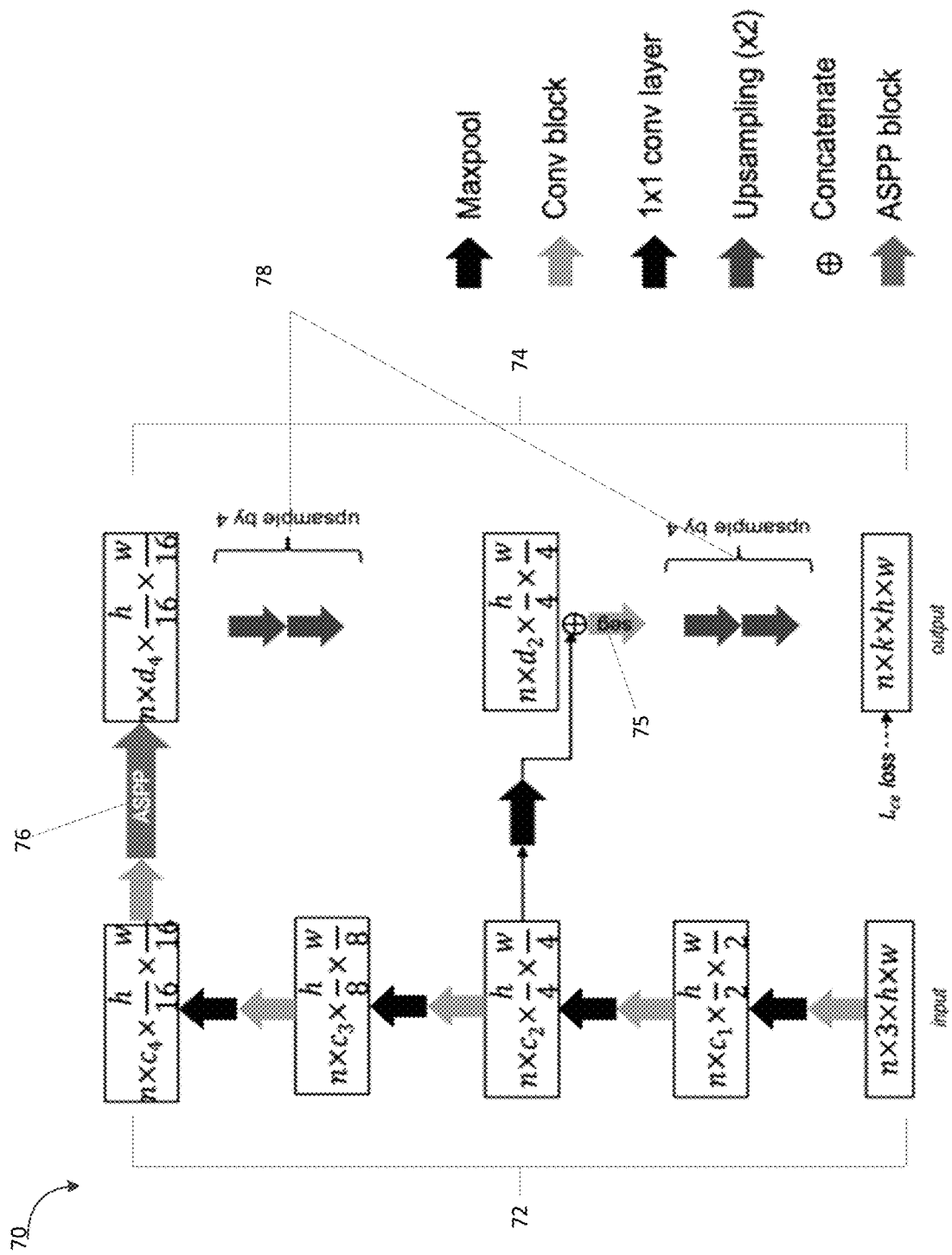
FIG. 5 is an example computer vision architecture implemented by the system of the present disclosure.

In some embodiments, as shown in FIG. 5 (which shows an example computer vision architecture of a computer vision network implemented by the system 10 of the present disclosure), the architecture 70 of the computer vision network includes two parts, a feature encoder 72 and a decoder 74. The encoder 72 adopts ResNet-101 and removes global average pooling and fully connected layers, and keeps the convolutional blocks. The ResNet encoder 72 is modified by changing the stride of Conv layer to 1 and introduce maxpool layers after Conv blocks to maintain the receptive field same as the original DeepLabV3+ setup. The decoder 74 uses (a) atrous spatial pyramidal pooling (ASPP) layer 76, (b) two (bilinear) upsampling layers 78, and (c) a final Cony block 75 (referred to as segmentation block). The segmentation (seg) block 75 can have two Cony layers, each followed by batchnorm and Relu. This takes in ASPP features concatenated with lower-level features (from second Cony block, as shown in FIG. 5). Two upsampling layers 78 are applied before and after the final Cony block 75. This can achieve upsampling by 16 times (from ASPP features) and make the output resolution the same as the original input resolution.

Figure 6:
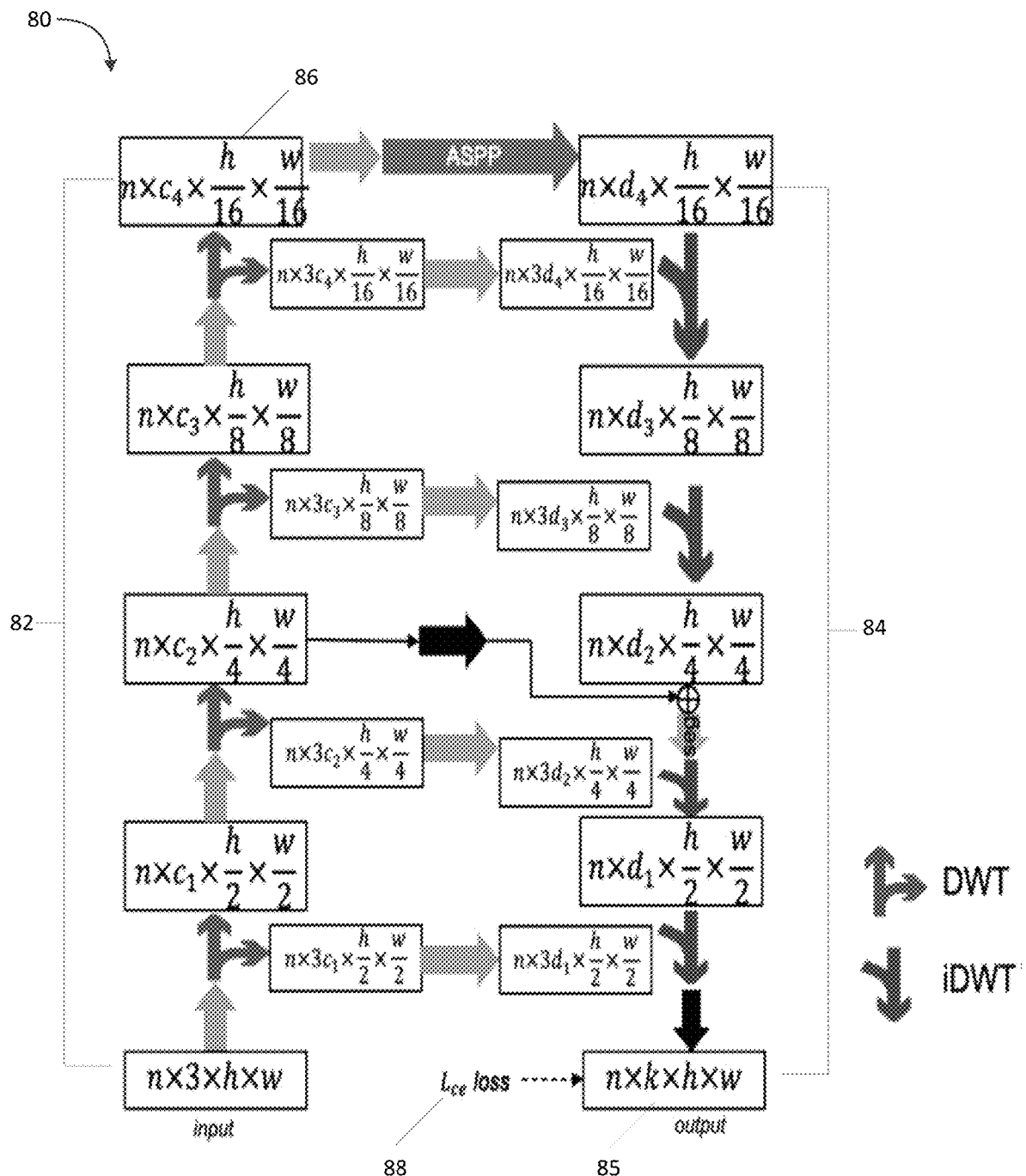
FIG. 6 is another example of a computer vision architecture implemented by the system of the present disclosure.

In some embodiments, as shown in FIG. 6 (which shows another example computer vision architecture of a computer vision network implemented by the system 10 of the present disclosure), the architecture 80 of the computer vision network includes a feature encoder 82 and a feature decoder 84. The architecture 80 replaces pooling layers with DWT and cache HF bands to be reused in iDWT in place of upsampling layers in the decoder 84. The architecture 80 is also referred as to a wavelet pool net (WPNet). DWT layers decompose input feature tensors into the LF band and three HF bands (Eq. 1). The system 10 can concatenate three HF bands in channel dimensions to form a single tensor. LF band can be treated as pooled tensor and passed to the next layers. HF bands are cached and processed with additional side Cony blocks before passing them to iDWT layers. iDWT layers treat these side features as HF bands and features from top layers as LF bands and apply inverse transform as in Eq. 2. One 1×1 Cony layer can be added after the final iDWT layer to let the network refine the iDWT upsampled output.

Figure 7:
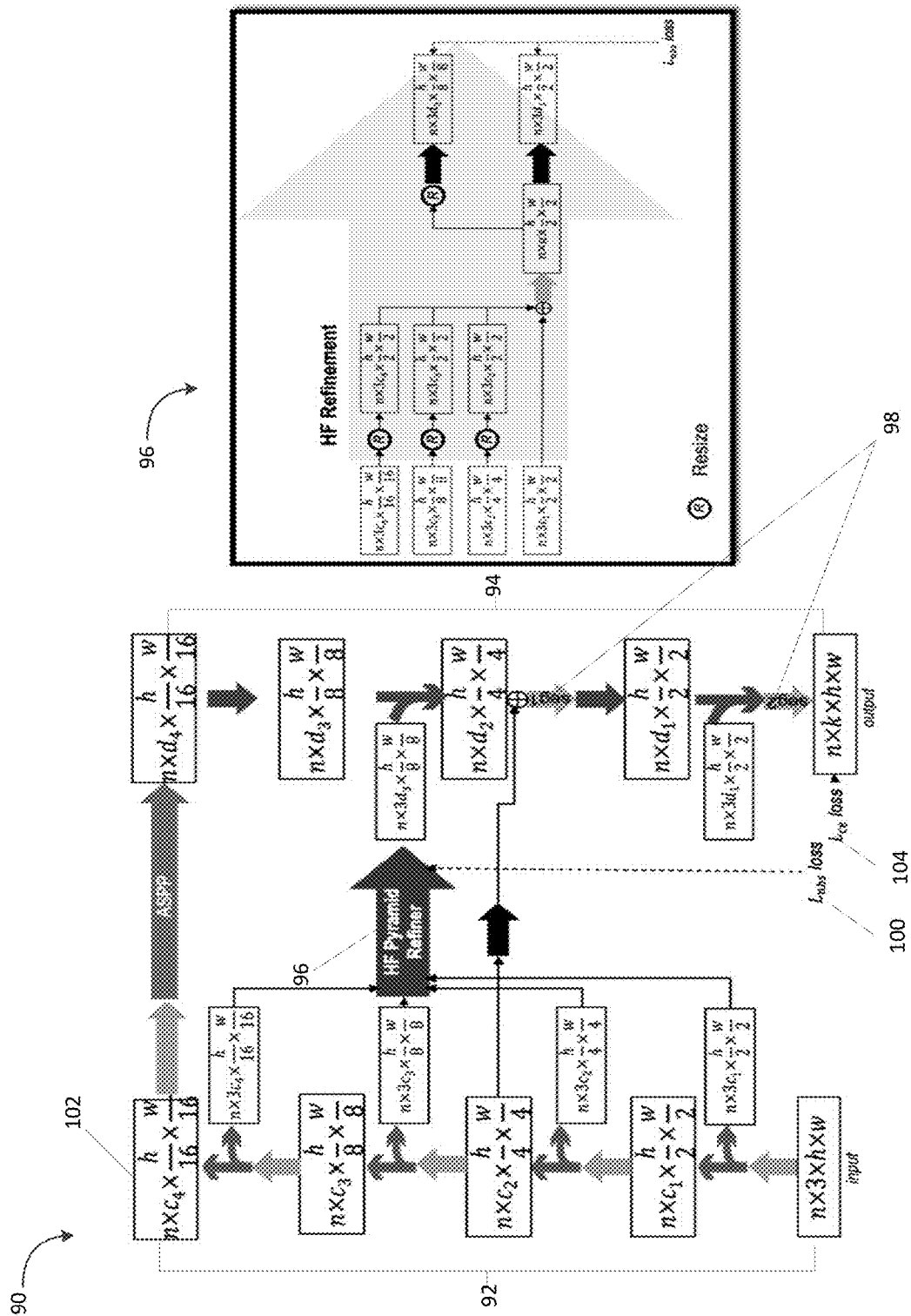
FIG. 7 is another example architecture setup of a computer vision network implemented by the system of the present disclosure.

In some embodiments, as shown in FIG. 7 (which shows another example computer vision architecture of a computer vision network implemented by the system 10 of the present disclosure), the architecture 90 of the computer vision network includes a feature encoder 92 and a feature decoder 94. The architecture 90 is also referred as to a wavelet boundary network (WBNet). The architecture 90 further includes (i) HF band refinement block 96, (ii) modified seg block 98, and (iii) nonboundary suppression (NBS) loss 100.

The HF band refinement block 96 can be used for learning the dependency between HF bands of different scales and refining side features accordingly. All HF bands from multiple levels (4 levels shown in FIG. 7) of the encoder 92 are collected and are refined to be coherent with each other. The refined HF bands are supplied for iDWT layers in the decoder 94. This can be implemented using a side-convolutional block) that takes a feature tensor concatenated with HF bands from all four DWT layers. The resizing operator can apply coarser levels to facilitate channel axis concatenation. The refined HF bands are reconstructed via 1×1 Cony layers to have an appropriate number of channels as needed by iDWT layers in the decoder 94. This will let the network to learn the coherent HF bands at different resolutions. HF bands are produced for all four layers of iDWT in the decoder 94. In some embodiments, two iDWT layers can yield maximal performance gains by being computationally effective.

The modified Seg block 98 includes two Cony layers. The second Cony layer is moved to the very last, i.e., after the final iDWT layer. This allows the network the refine the final upsampled result without additional computational load.

Referring back to FIG. 3, in step 56, the system 10 applies the feature decoder to an output of the feature encoder based at least in part on one of inverse discrete wavelet transform layers. For example, as shown in FIGS. 6 and 7, the feature decoders 84 and 94 are applied to outputs 86 and 102 of the feature encoders 82 and 92, respectively.

In step 58, the system 10 determines boundaries of the one or more land properties based at least in part on a boundary cross-entropy loss function. In some embodiments, a boundary cross-entropy loss function can be used to train the computer network. For example, as shown in FIG. 6, the boundary cross-entropy loss function 88 can be applied to the output 85 of the feature decoder 84 to train the computer vision network. In some embodiments, a multi-label cross entropy-based objective can be used, which is given as:

$$L_{ce}(\hat{Y}, Y; \theta) = -\sum_k \sum_p \left( \beta Y_k(p) \log \hat{Y}_k(p; \theta) + \right.$$ Equation (3)
$$\left. (1-\beta)(1-Y_k(p)) \log(1 - \hat{Y}_k \hat{Y}_k(p; \theta)) \right)$$

where θ denotes the weights of the network; and p and k represent indices of pixel and class respectively. $\hat{Y}$ and Y represent prediction and ground truth label maps. β is the percentage of non-edge pixels in the image to account for skewness of sample numbers.

In some embodiments, as mentioned above, as shown in FIG. 7, the nonboundary suppression (NBS) loss 100 can be combined with the boundary cross-entropy loss 104 to train the computer vision network. The nonboundary suppression (NBS) loss 100 can suppress the activity around nonboundary pixels in refined HF bands. The NBS loss 100 can be a loss function that acts on the refinement block's outputs to force HF coefficients at non-boundary pixels to be zero. Also, this might help the network to learn appearance-agnostic shape cues for boundaries detection. The NBS loss 100 can be implemented as follows:

$$L_{nbs}(\hat{W}, Z; \theta) = \sum_l \sum_p (1 - Z_l(p)) |\hat{W}_l(p)|$$ Equation (4)

where Z is binary mask representation of GT labels to represent class agnostic boundary pixels. $Z_l$ is mask tensor obtained by repeating itself in channel axis. This would be used to mask the refined HF bands ($\hat{W}_l$) at level l. In this way, this loss tries minimize HF activity around nonboundary pixels. Thus, the final training objective becomes:

$$L = L_{ce} + \lambda L_{nbs}$$

where λ controls the weight of non-boundary suppression loss (e.g., λ=1e-2).

Figure 4:
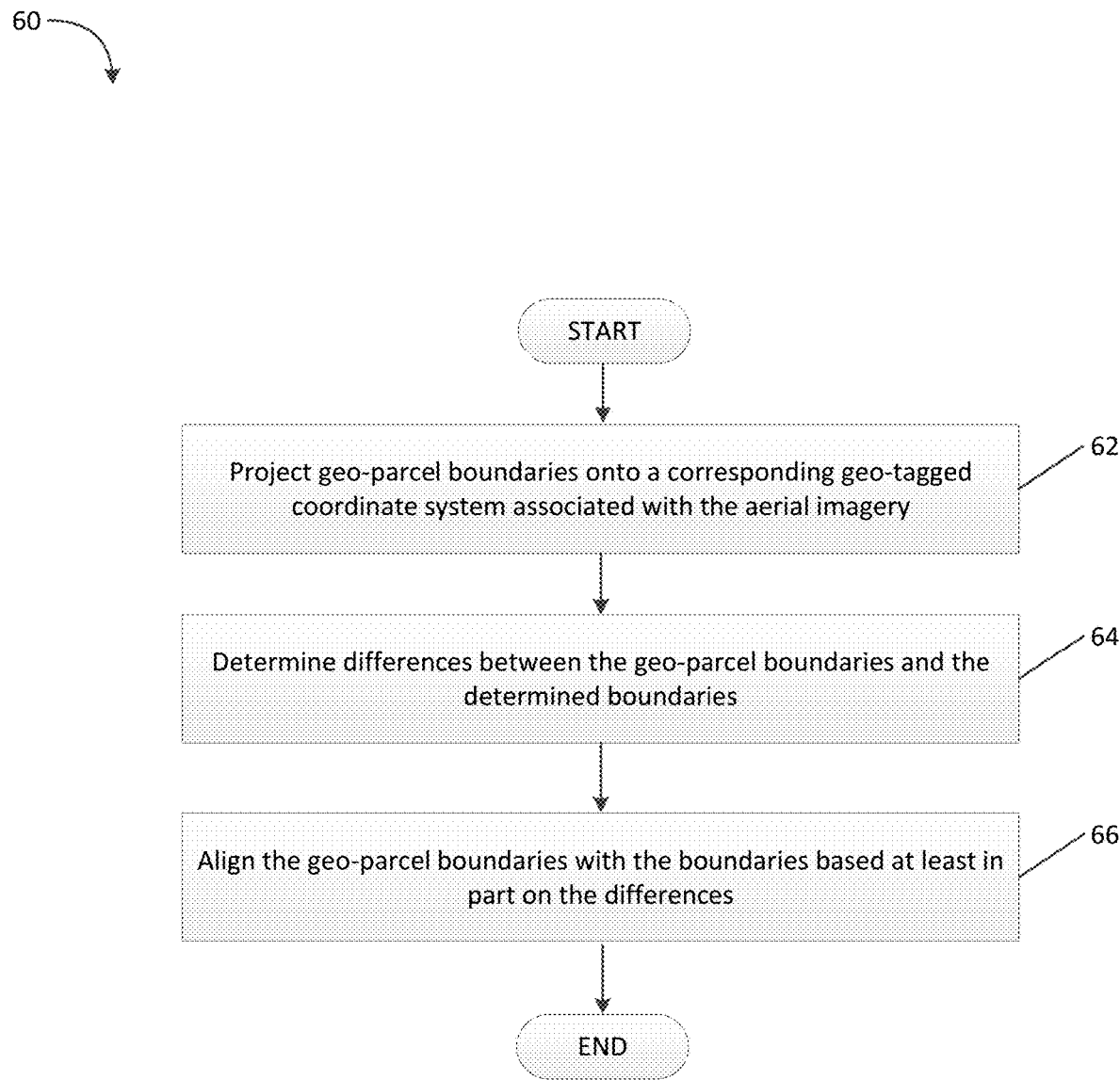
FIG. 4 illustrates the step 60 of FIG. 3 in the greater detail.
Figure 8:
FIG. 8 illustrates Geo-parcel alignment performed by the system of the present disclosure, using detected boundaries.

In step 60, the system 10 aligns geo-parcel boundaries with the determined boundaries. FIG. 4 illustrates step 60 in the greater detail. In step 62, the system 10 projects geo-parcel boundaries onto a corresponding geo-tagged coordinate system associated with the aerial imagery. For example, Geo-parcel data is generally used to identify public and private land property boundaries for tax assessment processes. Parcels are shapefiles from the records maintained by local counties and represent latitude-longitude GPS coordinates of the property boundaries. The system 10 can project these parcel shapes (using perspective projection) onto a corresponding geo-tagged coordinate system of the camera with which aerial imagery was captured. This process results in binary contour images, as shown in parcel images 152 in the second column of FIG. 8 (which illustrates an example Geo-parcel alignment using detected boundaries of the present disclosure). These contours are ideally expected to match visual properties in the corresponding region's aerial image (shown in aerial image 150 in the first column of FIG. 8). However, due to several differences in their collection processes, these two modalities of the data often misalign to a large extent, sometimes on the order of 10 meters. The last column of FIG. 8 depicts the misalignment of the original (before alignment) parcel contours overlaid on the aerial image in cyan color. This misalignment might lead to wrong property assignments to individuals, thus, incorrect tax assessments. These two geographical data modalities need to be aligned well before using it to assist property assignment and tax assessment processes. The system 10 can be trained on various aerial properties dataset. Given an aerial image tile 150, as shown in FIG. 8, the system 10 divides the tile 150 into 48 non-overlapping patches and feeds them as a batch to the computer vision network. The model predictions are stitched back to form a prediction map at tile resolution, as shown in boundaries 154 in the third column of FIG. 8. The system 100 can perform an image registration task by considering geo-parcel and boundary maps as moving and target images, respectively. For example, the system 10 can use an image registration tool (e.g., Elastix) for the registration process. A few samples of final aligned parcels are overlaid with magenta color in FIG. 8. Table 160 compares the results of the system 10 (e.g., using WBNet described in FIG. 7) with ProAlignNet based framework that uses CASENet for road contours detection and uses a deep network to align the geo-parcel boundaries to detected road contours. The system 10 achieves 2% better alignments (under 3 ft offset threshold) compared to ProAlignNet. This is due to sharper and clear boundary detections from the system 10.

In step 64, the system 10 determines differences between the geo-parcel boundaries and the determined boundaries. For example, the system 10 can compare the geo-parcel boundaries and the determined boundaries to determine if the geo-parcel boundaries matches he determined boundaries.

In step 66, the system 10 aligns the geo-parcel boundaries with the boundaries based at least in part on the differences. For example, as mentioned above, the system 10 can use an image registration tool to move the geo-parcel boundaries to the same positions of the determined boundaries.

Figure 9:
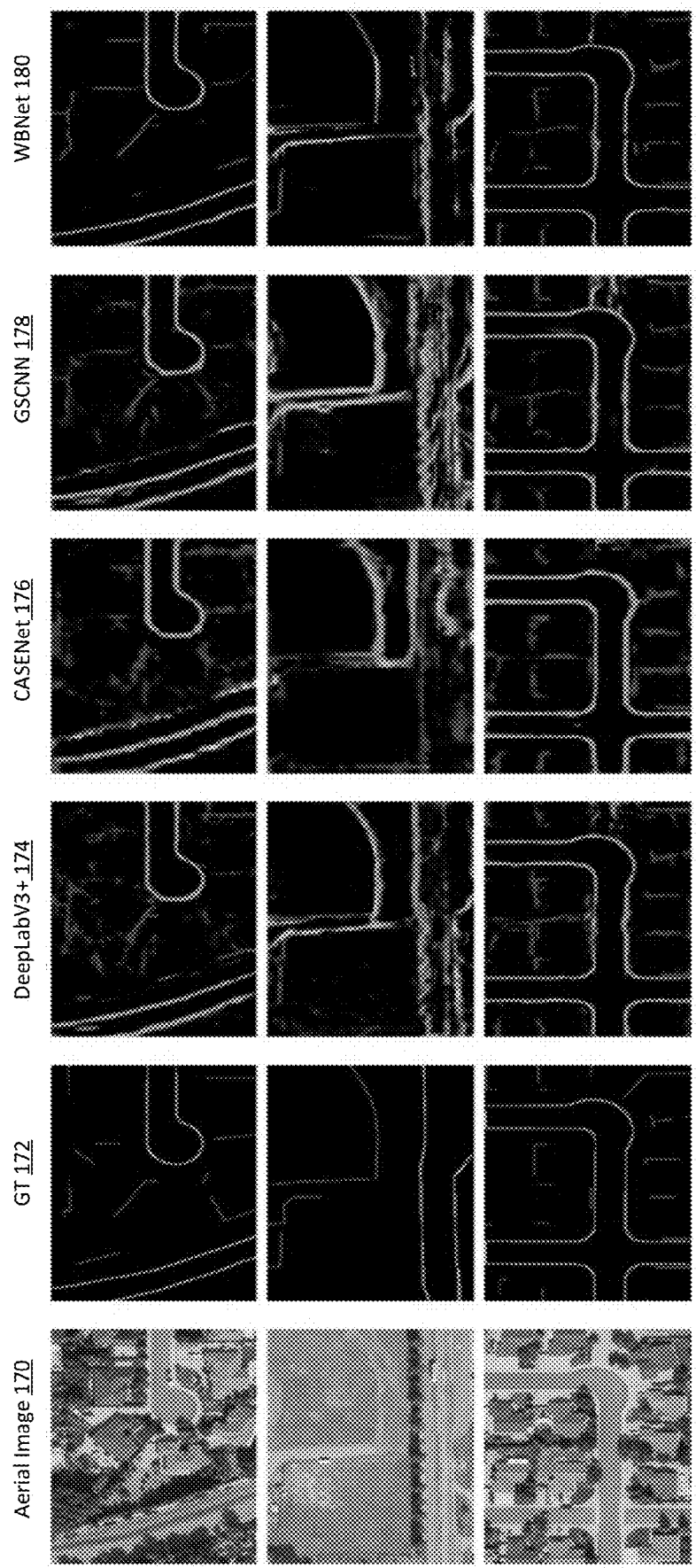
FIG. 9 illustrates a qualitative comparison of different methods for detecting property boundaries.

FIG. 9 illustrates a qualitative comparison of different methods detecting property boundaries. The results of the system 10 (referred to in FIG. 9 as WBNet 180) is compared with the results from the DeepLabV3+ 174, CASENet 176, and GSCNN 178. Compared with other methods, the WBNet 180 is the closest to the ground truth (GT) 172.

FIG. 10 is a table 180 showing mF scores for different methods performing property boundary detection on the aerial properties dataset. The mean F1 score (mF) is averaged along the boundaries for each class, with a threshold of 0.5 on sigmoid scores. mF scores given a small slack in the distance are used. These can be computed using morphologically dilated ground-truth masks with disk sizes of 3,5 and 9 pixels that correspond to offsets of 15, 25 and 45 centimeters, respectively. Please note that when disk size is 1 pixel (cf. Table 180), mF scores are computed without dilation on the masks. The architectures (WPNet and WBNet) perform better than the existing methods. Both WPNet and WBNet both improve the class-II performance levels by 3.6% and 11%, respectively. WBNet yields a 77.2% mF score, which is still 7% better than the others.

Figure 11:
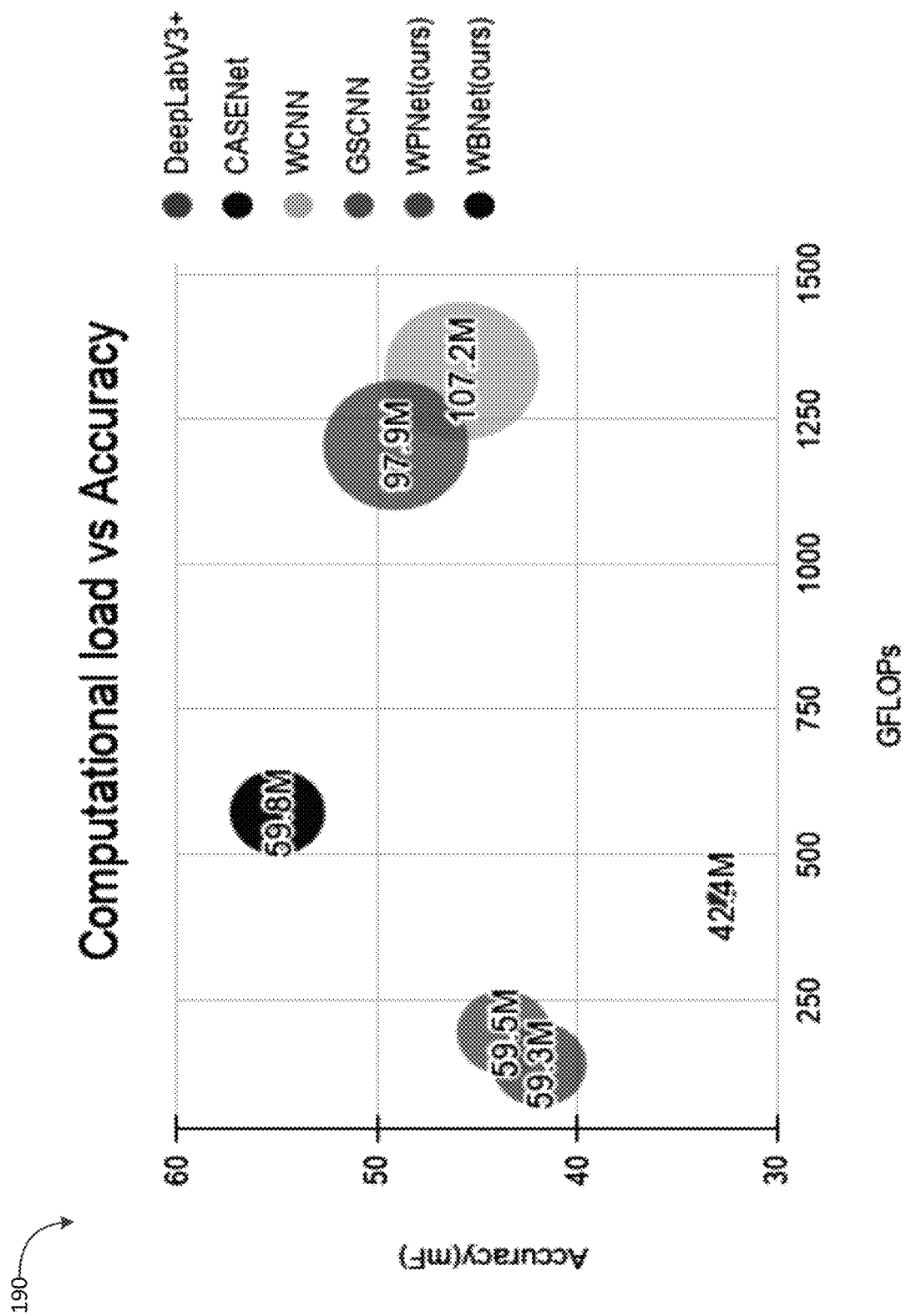
FIG. 11 is a plot showing accuracy as a function of computational load and model size.

FIG. 11 is a graph illustrating accuracy as a function of computational load and model size. FIG. 11 shows the bubble plot with the computational load (Giga floating-point-operations, GFLOPs) on the x-axis, accuracy on the y-axis. Bubble size represents the model size in terms of the number of parameters. Both WPNet and WCNN are computationally heavy and memory intensive models. The WBNet achieves a 22.2% gain in performance.

Figure 12:
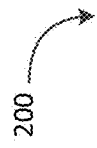
FIG. 12 is a table quantifying the impact of HF refinement and nonboundary suppression loss for different feature encoder bases.

FIG. 12 is a table 200 quantifying the impact of HF refinement and nonboundary suppression loss for different feature encoder bases. VGG-19, ResNet-50, and ResNet-101 are used for the encoder. Here, WBNet– denotes a WBNet model variant trained without non-boundary suppression loss, and WBNet=represents a variant without both HF refinement and NBS loss. As can be seen from the table 200 that the WBNet achieves the improvements between 2.0 and 15.2% (compared to baseline) utilizing DWT transforms in the architectural variants. In particular, WBNet performs better than WPNet by between 0.6 to 5.9%, due to the HF refinement module and NBS loss in WBNet. When NBS loss is dropped from WBNet training (WBNet–), performance levels drop at least by 0.5% across all base encoders. Similarly, when the HF refiner is removed from WBNet (WBNet=), the minimum performance drop is 3.7%. This demonstrates that both the HF refinement module and NBS loss contribute effectively and consistently across all backbone architectures in performance increments.

Figure 13:
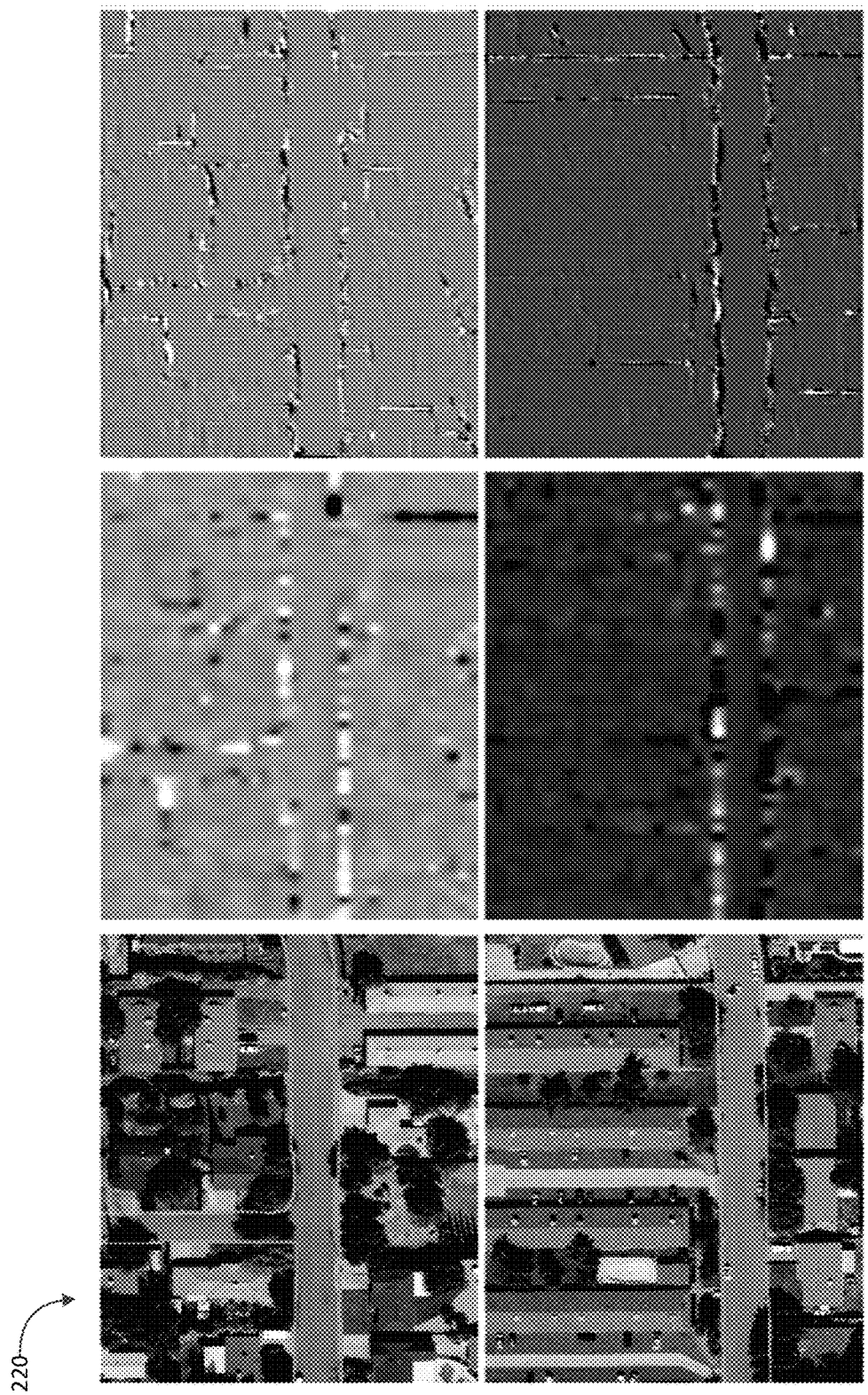
FIG. 13 illustrates HF bands visualizations.

FIG. 13 illustrates HF band visualizations. In particular, FIG. 13 is a visualization 220 of the HF bands from the refinement module. These are computed by averaging the two HF band feature tensors over the channel axis, which are fed into two iDWT layers of the decoder of WBNet. It is observed that in these refined bands, much of the activity is centered around boundary regions, while other areas are mostly uniform and close to zero. Hence, WBNet seems to be learning to produce high-quality HF details for the class-agnostic boundaries fed to the decoder's iDWT modules.

Figure 14:
FIG. 14 illustrates a comparison of model generalization to unseen INRIA aerial dataset.
Figure 14:
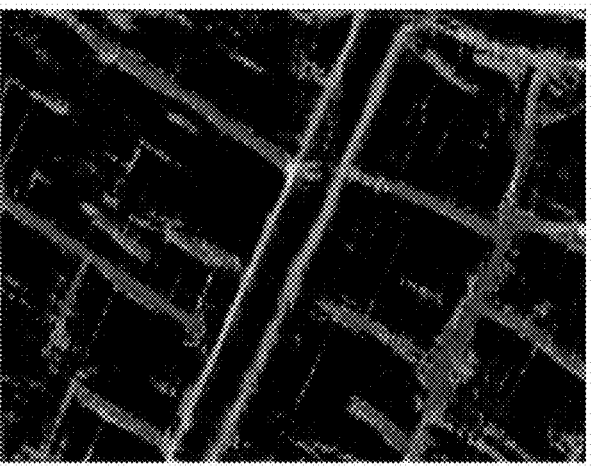
Figure 14:
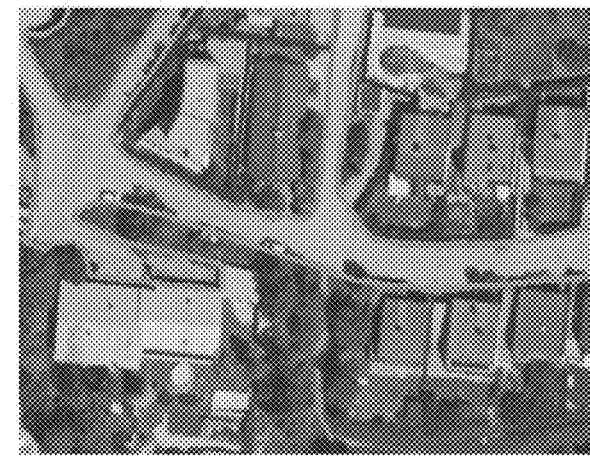
Figure 14:

FIG. 14 illustrates model generalization 250 to unseen INRIA aerial dataset. The aerial properties dataset was captured only in and around Reddings city with low-altitude settings. To demonstrate the generalization of the models learned on this dataset, the system 10 performs on INRIA aerial image labeling dataset. This dataset was initially created for building segmentation task. Here, we adopt two large aerial tiles (5000×5000) from this set: one from Austin and the other from Tyrol-west, and label these tiles with property boundary labels similar to the aerial property dataset. These labels are used to quantify the generalization capabilities of the WBNet. FIG. 14 shows two sample patches from the INRIA set and the corresponding detections from the WBNet model (trained on aerial properties dataset). The INRIA dataset is different from our training dataset in that it was captured in very different regions (of the US and Europe) and different altitudes. Yet the results from WBNet are reasonably good without any finetuning. These results quantitatively stand around on average of 63% and 54% mF scores (with 3 threshold) on Austin and Tyrol-west tiles, respectively.

Figure 15:
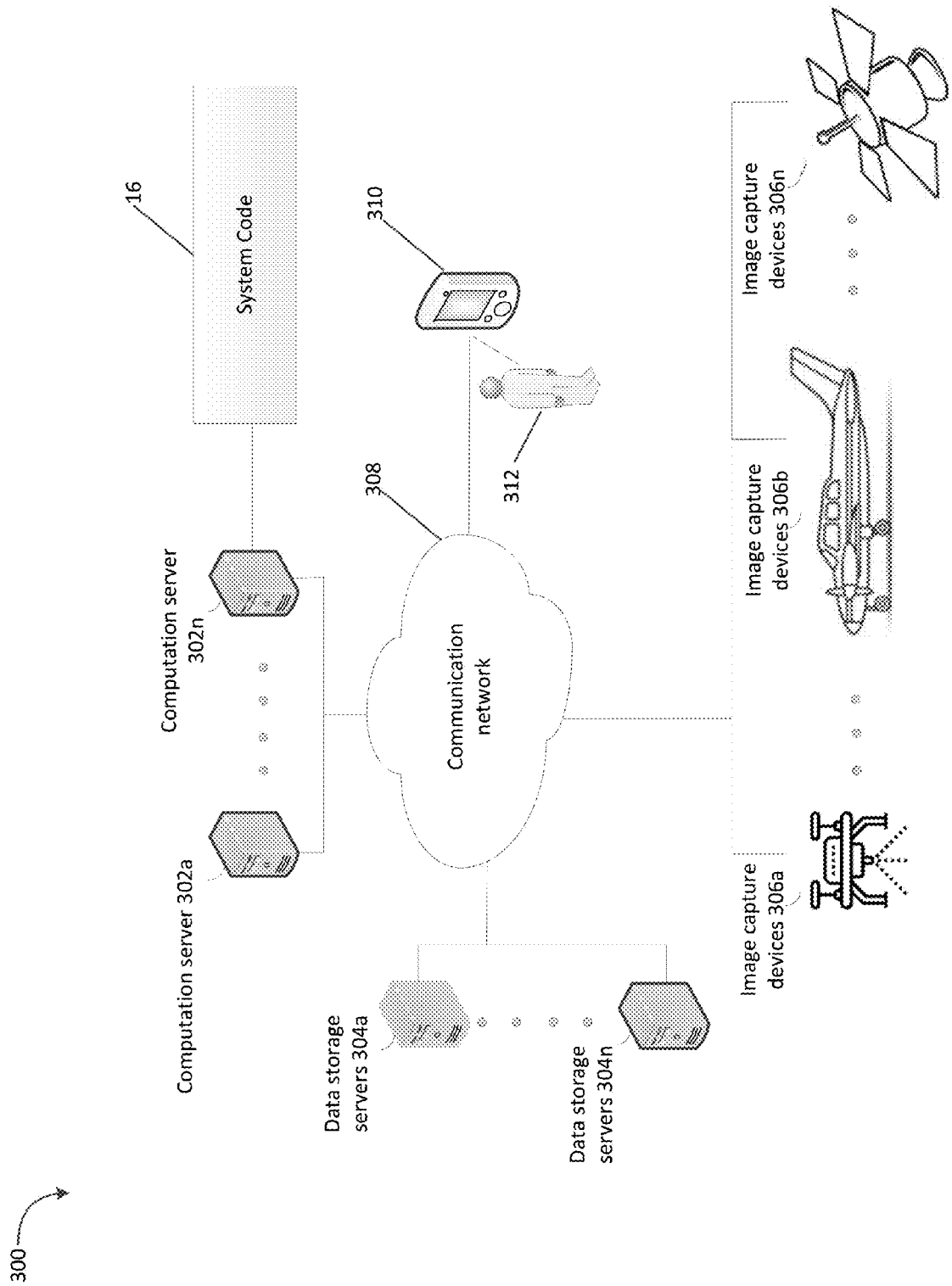
FIG. 15 is a diagram illustrating hardware and software components capable of being utilized to implement the system of the present disclosure.

FIG. 15 a diagram illustrating computer hardware and network components on which the system 300 can be implemented. The system 300 can include a plurality of computation servers 302a-302n having at least one processor (e.g., one or more graphics processing units (GPUs), microprocessors, central processing units (CPUs), etc.) and memory for executing the computer instructions and methods described above (which can be embodied as system code 16). The system 300 can also include a plurality of data storage servers 304a-304n for receiving image data and/or video data. The system 300 can also include a plurality of image capture devices 306a-306n for capturing image data and/or video data. For example, the camera devices can include, but are not limited to, an unmanned aerial vehicle 306a, an airplane 306b, and a satellite 306n. A user device 310 can include, but it not limited to, a laptop, a smart telephone, and a tablet to capture an image of an asset, display an identification of a structural item and a corresponding material type to a user 312, and/or to provide feedback for fine-tuning the models. The computation servers 302a-302n, the data storage servers 304a-304n, the image capture devices 306a-306n, and the user device 310 can communicate over a communication network 308. Of course, the system 300 need not be implemented on multiple devices, and indeed, the system 300 can be implemented on a single (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following Claims.

The invention claimed is:

1. A system for detecting land property boundaries on aerial imagery, comprising:
 a memory; and
 a processor in communication with the memory, the processor:
 receiving an image having one or more land properties;
 processing the image using a feature encoder having a plurality of levels to the image, a first level of the plurality of levels comprising a convolution block and a discrete wavelet transform layer, wherein the discrete wavelet transform layer decomposes an input feature tensor to the first level into a low-frequency band and a high-frequency band, wherein the high-frequency band is cached and processed with one or more side-convolutional blocks before the high-frequency band is passed to a feature decoder;
 processing an output of the feature encoder based at least in part on a plurality of inverse discrete wavelet transform layers; and
 determining boundaries of the one or more land properties based at least in part on a boundary cross-entropy loss function.

2. The system of claim 1, wherein the processor processes the image by:
 refining, via the one or more side-convolutional blocks, high-frequency bands collected from each level of the plurality of levels to be coherent with each other; and
 providing, via the one or more side-convolutional blocks, the refined high-frequency bands to at least one of the plurality of inverse discrete wavelet transform layers.

3. The system of claim 1, wherein the processor processes the image by:
 providing the high-frequency band to at least one of the plurality of inverse discrete wavelet transform layers.

4. The system of claim 1, wherein the processor applies a first segmentation block prior to applying at least one inverse discrete wavelet transform layer of the plurality of inverse discrete wavelet transform layers.

5. The system of claim 4, wherein the processor applies a second segmentation block subsequent to applying the at least one inverse discrete wavelet transform layer.

6. The system of claim 1, wherein determining the boundaries of the one or more land properties is further based at least in part on a non-boundary suppression loss function.

7. The system of claim 1, wherein the boundaries of the one or more land properties include road-connected boundaries, and/or boundaries that divide the land property from neighbors.

8. The system of claim 1, wherein the processor applies an atrous spatial pyramidal pooling layer to the output of the feature encoder.

9. The system of claim 1, wherein the processor further aligns geo-parcel boundaries with the boundaries of the one or more land properties by:
 projecting the geo-parcel boundaries onto a corresponding geo-tagged coordinate system associated with the aerial imagery;
 determining differences between the geo-parcel boundaries and the boundaries of the one or more land properties; and
 aligning the geo-parcel boundaries with the boundaries of the one or more land properties based at least in part on the differences.

10. A method for detecting land property boundaries on aerial imagery, comprising:
 receiving an image having one or more land properties;
 processing the image using a feature encoder having a plurality of levels, a first level of the plurality of levels comprising a convolution block and a discrete wavelet transform layer, wherein the discrete wavelet transform layer decomposes an input feature tensor to the first level into a low-frequency band and a high-frequency band, wherein the high-frequency band is cached and processed with one or more side-convolutional blocks before the high-frequency band is passed to a feature decoder;
 processing an output of the feature encoder based at least in part on a plurality of inverse discrete wavelet transform layers; and
 determining boundaries of the one or more land properties based at least in part on a boundary cross-entropy loss function.

11. The method of claim 10, wherein processing the image using the feature encoder comprises the steps of:
 refining, via the one or more side-convolutional blocks, high-frequency bands collected from each level of the plurality of levels to be coherent with each other; and
 providing, via the one or more side-convolutional blocks, the refined high-frequency bands to at least one of the plurality of inverse discrete wavelet transform layers.

12. The method of claim 10, wherein processing the image comprises the step of providing the high-frequency band to at least one of the plurality of inverse discrete wavelet transform layers.

13. The method of claim 10, wherein processing the output of the feature encoder comprises the step of applying a first segmentation block prior to applying at least one inverse discrete wavelet transform layer of the plurality of inverse discrete wavelet transform layers.

14. The method of claim 13, further comprising the step of applying a second segmentation block subsequent to applying the at least one inverse discrete wavelet transform layer.

15. The method of claim 10, wherein determining the boundaries of the one or more land properties is further based at least in part on a non-boundary suppression loss function.

16. The method of claim 10, wherein the boundaries of the one or more land properties include road-connected boundaries, and/or boundaries that divide the land property from neighbors.

17. The method of claim 10, further comprising applying an atrous spatial pyramidal pooling layer to the output of the feature encoder.

18. The method of claim 10, further comprising:
projecting geo-parcel boundaries onto a corresponding geo-tagged coordinate system associated with the aerial imagery;
determining differences between the geo-parcel boundaries and the boundaries of the one or more land properties; and
aligning the geo-parcel boundaries with the boundaries of the one or more land properties based at least in part on the differences.

19. A non-transitory computer readable medium having instructions stored thereon for detecting land property boundaries on aerial imagery which, when executed by a processor, causes the processor to carry out the steps of:
receiving an image having one or more land properties;
processing the image using a feature encoder having a plurality of levels, a first level of the plurality of levels comprising a convolution block and a discrete wavelet transform layer, wherein the discrete wavelet transform layer decomposes an input feature tensor to the first level into a low-frequency band and a high-frequency band, wherein the high-frequency band is cached and processed with one or more side-convolutional blocks before the high-frequency band is passed to a feature decoder;
processing an output of the feature encoder based at least in part on a plurality of inverse discrete wavelet transform layers; and
determining boundaries of the one or more land properties based at least in part on a boundary cross-entropy loss function.

20. The non-transitory computer readable medium of claim 19, wherein processing the image comprises the steps of:
refining, via the one or more side-convolutional blocks, high-frequency bands collected from each level of the plurality of levels to be coherent with each other; and
providing, via the one or more side-convolutional blocks, the refined high-frequency bands to at least one of the plurality of inverse discrete wavelet transform layers.

21. The non-transitory computer readable medium of claim 19, wherein processing the image comprises the step of providing the high-frequency band to at least one of the plurality of inverse discrete wavelet transform layers.

22. The non-transitory computer readable medium of claim 19, wherein processing the output of the feature encoder comprises the step of applying a first segmentation block prior to applying at least one inverse discrete wavelet transform layer of the plurality of inverse discrete wavelet transform layers.

23. The non-transitory computer readable medium of claim 22, further comprising the step of applying a second segmentation block subsequent to applying the at least one inverse discrete wavelet transform layer.

24. The non-transitory computer readable medium of claim 19, wherein determining the boundaries of the one or more land properties is further based at least in part on a non-boundary suppression loss function.

25. The non-transitory computer readable medium of claim 19, wherein the boundaries of the one or more land properties include road-connected boundaries, and/or boundaries that divide the land property from neighbors.

26. The non-transitory computer readable medium of claim 19, further comprising applying an atrous spatial pyramidal pooling layer to the output of the feature encoder.

27. The non-transitory computer readable medium of claim 19, further comprising:
projecting geo-parcel boundaries onto a corresponding geo-tagged coordinate system associated with aerial imagery;
determining differences between the geo-parcel boundaries and the boundaries of the one or more land properties; and
aligning the geo-parcel boundaries with the boundaries of the one or more land properties based at least in part on the differences.

* * * * *